United States Patent [19]

Butchko

[11] 4,335,280
[45] Jun. 15, 1982

[54] TELEPHONE CONSTRUCTION

[76] Inventor: Joseph J. Butchko, P.O. Box G-747, Station "G", Calgary, Alberta, Canada

[21] Appl. No.: 197,002

[22] Filed: Oct. 14, 1980

Related U.S. Application Data

[63] Continuation-in-part of Ser. No. 43,169, May 29, 1979, abandoned.

[51] Int. Cl.³ .................. H04M 1/31; H04M 1/35
[52] U.S. Cl. ..................... 179/90 R; 179/90 FW; 179/100 R; 179/100 D
[58] Field of Search ......... 179/90 R, 90 AD, 90 FW, 179/100 R, 100 D, 103, 178, 179, 158 R

[56] References Cited

U.S. PATENT DOCUMENTS

| | | | |
|---|---|---|---|
| 1,038,419 | 9/1912 | Nevin | 179/90 R |
| 1,040,389 | 10/1912 | Nevin | 179/90 R |
| 1,251,495 | 1/1918 | Forsberg | 179/90 R |
| 1,257,180 | 2/1918 | Betulander | 179/90 R |
| 2,236,997 | 4/1941 | Feinberg | 179/90 R |
| 2,502,440 | 4/1950 | Deakin | 179/90 R |
| 2,503,542 | 4/1950 | Brander | 179/90 R |
| 2,635,230 | 4/1953 | Madden | 179/90 R |
| 2,881,521 | 5/1959 | Doring | 179/90 R |
| 3,072,749 | 1/1963 | Haussermann | 179/90 R |

FOREIGN PATENT DOCUMENTS

| | | | |
|---|---|---|---|
| 238899 | 1/1960 | Australia | 179/90 R |
| 2302239 | 7/1979 | Fed. Rep. of Germany | 179/90 R |

Primary Examiner—Gerald L. Brigance
Attorney, Agent, or Firm—Stanley G. Ade

[57] ABSTRACT

A casing contains the operative portion of a telephone including a speaker adjacent one end and a microphone adjacent the other. The dialing mechanism includes a conventional rotary assembly actuated by a longitudinally extending slider bar mounted in the top surface of the casing. This slider bar includes a ratchet gear along one edge engaging with corresponding gear teeth formed or secured around the periphery of the rotary portion of said rotary assembly. Indicia are provided on the upper side of the slider bar and finger engaging means are also provided on the upper side of the slider bar with the indicia being between adjacent finger engaging means. The upper side of the slider bar is visible through an opening in the top of the casing and the slider bar is moved digitally along the opening until the finger of the operator engages one end of the opening whereupon the slider bar may be released and the spring of the rotary assembly returns the slider bar to the original position.

5 Claims, 9 Drawing Figures

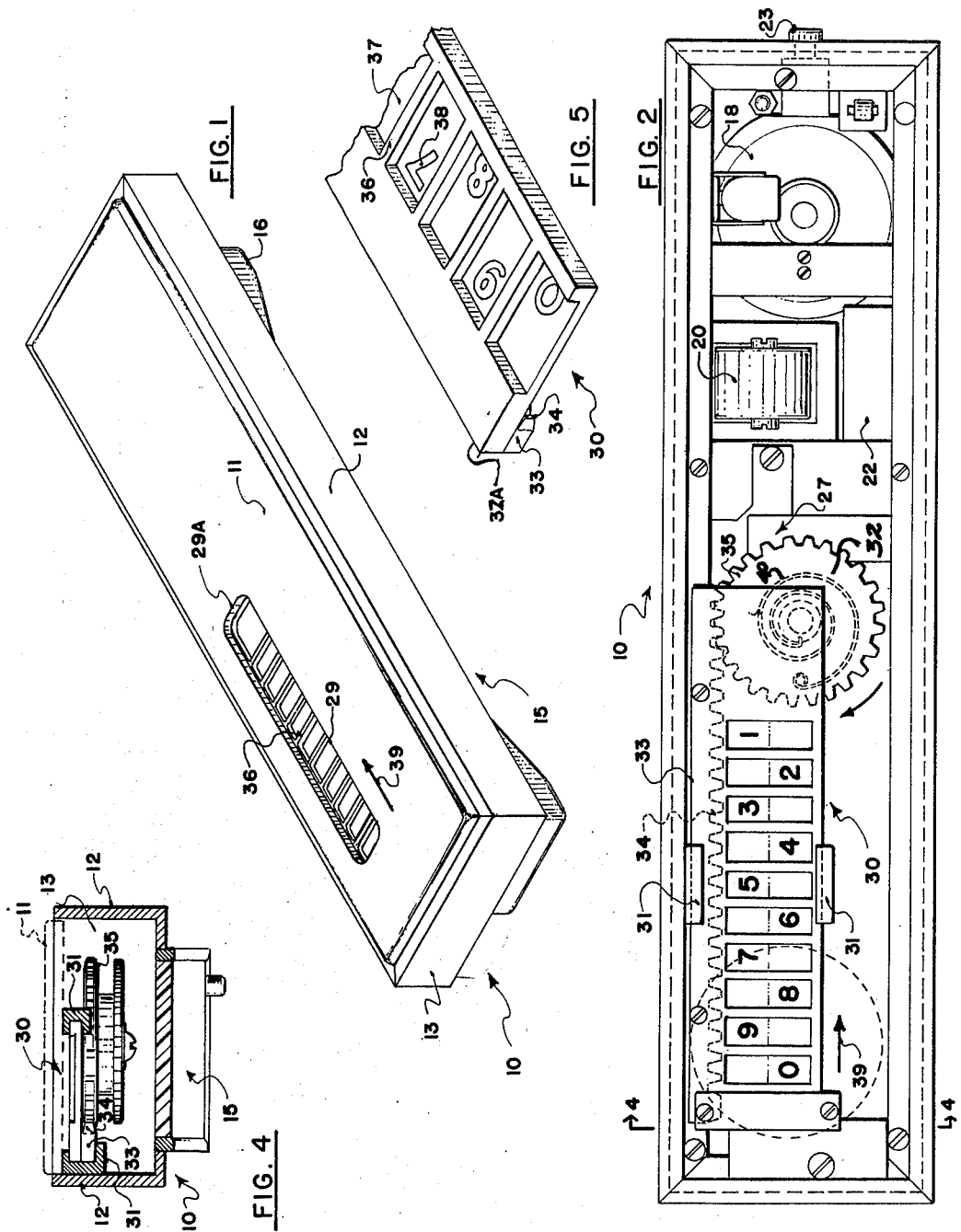

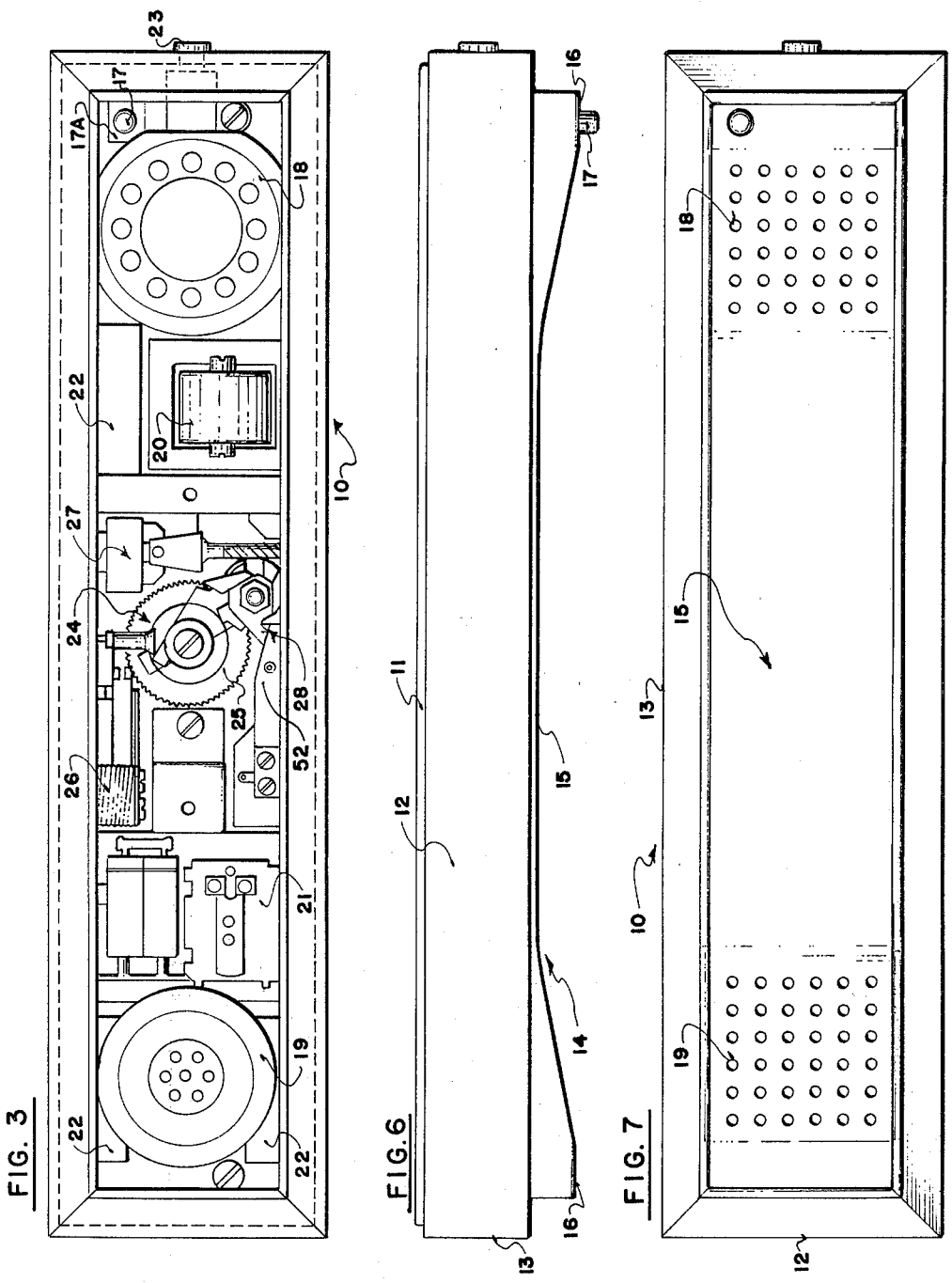

TELEPHONE CONSTRUCTION

BACKGROUND OF THE INVENTION

This invention relates to new and useful improvements in telephone assemblies, particularly telephone assemblies which are operated by a conventional rotary assembly and constitutes a Continuation-in-Part application to United States application, Ser. No: 043,169, filed May 29th, 1979, now abandoned.

Conventionally, such assemblies include a rotary portion which includes a multi-apertured dial on the face thereof. The operator uses a finger or a pencil or some such similar object to engage the relevant aperture whereupon the rotary portion is rotated to a stop and then released. Spring means within the rotary assembly returns the rotary portion to the original position thus enabling the operator to dial a preselected number.

While such rotary dials are convenient for conventional telephones, nevertheless when a telephone is re-designed with completely different configuration, the rotary portion of a conventional rotary assembly either is too large to fit upon the re-designed telephone or, alternatively, is awkward to install and may not suit the desired new design.

SUMMARY OF THE INVENTION

The present invention overcomes these disadvantages by providing a telephone which is adapted to be mounted within a relatively narrow elongated casing and is provided with novel mechanism for operating the conventional rotary assembly which may be mounted within the casing and be completely contained therewithin.

In accordance with the invention there is provided a telephone assembly comprising in combination a casing including an upper side and a lower side, a dialing mechanism mounted within said casing, said dialing mechanism including a rotary assembly, said rotary assembly including a rotary portion and means to rotate said rotary portion, said means including a longitudinally extending slider bar mounted for reciprocal motion within the upper side of said casing and means operatively connecting said slider bar with said rotary portion of said rotary assembly, said means operatively connecting said slider bar with said rotary portion including a plurality of gear teeth extending along one side of said slider bar, and extending parallel to the horizontal plane of the slider bar and corresponding teeth upon the periphery of said rotary portion meshing with the gear teeth of said slider bar, whereby reciprocation of said slider bar rotates said rotary portion, said rotary assembly including a connect and disconnect switch, means on said rotary portion to operate said switch, a rotary impulse switch assembly within said casing movable from a switch open to a switch closed position as it rotates, gear means operatively connecting said rotary portion with said impulse switch assembly and a brake control component in said casing operatively connected to said impulse switch assembly, said impulse switch assembly including a skew gear rotatable therewith and a worm gear shaft engaging said skew gear, said brake control assembly being operatively connected to said worm gear shaft and means on said rotary portion operatively engaging said impulse switch assembly to maintain said impulse switch assembly in the closed position when said dial mechanism is in the released and stationary position.

In accordance with another embodiment of the invention there is provided a dialing mechanism for telephones comprising in combination a rotary assembly, said rotary assembly including a rotary portion and means to rotate said rotary assembly, said means including a longitudinally extending slider bar and means operatively connecting said slider bar with the rotary portion of said rotary assembly, said means including a plurality of gear teeth extending along one side of said slider bar and extending parallel to the horizontal plane of the slider bar, and corresponding teeth formed upon the periphery of the rotary portion of said rotary assembly, said corresponding teeth meshing with the gear teeth of said slider bar, said means to move said slider bar lengthwise including a plurality of spaced and parallel transversely extending ribs formed on the upper side of said slider bar and indicia on the upper side of the said slider bar between adjacent ribs, said rotary assembly including a connect and disconnect switch, means on said rotary portion to operate said switch, a rotary impulse switch assembly within said casing movable from a switch open to a switch closed position as it rotates, gear means operatively connecting said rotary portion with said impulse switch assembly and a brake control component in said casing operatively connected to said impulse switch assembly, said impulse switch assembly including a skew gear rotatable therewith and a worm gear shaft engaging said skew gear, said brake control assembly being operatively connected to said worm gear shaft and means on said rotary portion operatively engaging said impulse switch assembly to maintain said impulse switch assembly in the closed position when said dial mechanism is in the released and stationary position.

Another advantage of the present invention is the fact that the conventional rotary action is relatively small and easily fitted within the casing whereas the conventional dial for rotating the rotary action or assembly is somewhat larger in diameter and is not suitable for use with the present design.

Another advantage of the present invention is that the improved telephone is self-contained to the extent that both the speaker and microphone are mounted within a common casing together with means for operating the rotary assembly of the conventional rotary mechanism.

A still further advantage of the invention is to provide a device with the characters herewithin described which lends itself to the provision of a relatively slim and compact assembly.

Still another advantage of the present invention is to provide a device of the character herewithin described which is relatively simple in construction, economical in manufacture because of the use of many conventional parts, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is an isometric view of the telephone.

FIG. 2 is a plan view of FIG. 1 with the upper panel of the casing removed.

FIG. 3 is an underside view of FIG. 1 with the underside panel of the casing removed.

FIG. 4 is a cross sectional view substantially along the line 4—4 of FIG. 2.

FIG. 5 is a fragmentary isometric view of the slider bar per se.

FIG. 6 is a side elevation of the telephone.

FIG. 7 is an underside view of the telephone.

In the drawings like characters of reference indicate corresponding parts in the different figures.

DETAILED DESCRIPTION

Figure 8:
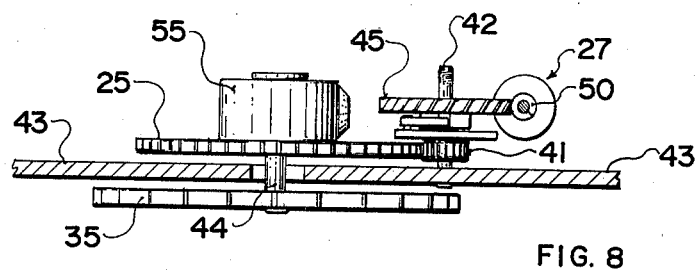
FIG. 8 is an enlarged fragmentary view of the dial portion shown in FIG. 3.

Proceeding therefore to describe the invention in detail, reference should first be made to FIG. 1 in which one embodiment of the invention is shown. It includes an elongated substantially rectangular casing collectively designated 10 including an upper rectangular panel 11, rectangular side panels 12, and end panels 13.

An underside panel assembly collectively designated 14 is provided to complete the enclosure and this underside panel is preferably but not essentially arcuately curved as at 15 and includes surface engaging portions 16 adjacent each end and extending transversely across the underside panel assembly 14. A spring loaded switch button 17 extends through one of the transverse ends 16 and operates a switch as will hereinafter be described, it being understood that when the telephone is resting on a supporting surface in the position shown in FIG. 6, button 17 will be depressed thus switching off the mechanism of the telephone, but when the telephone is lifted from this surface, the button 17 extends as shown thus switching on the internal circuits.

Situated within the casing are conventional components of a modern telephone including a microphone 18 adjacent one end thereof and communicating through one of the portions of the arcuately curved under surface 15. A conventional speaker 19 is also mounted within the casing adjacent the opposite end thereof and communicates through the other end of the arcuately curved surface 15 of the underside assembly 14.

A transformer 20 is mounted within the casing together with indicator means such as bell, tone or buzzer 21 and various electrical components such as condensers 22, all of which are conventional.

Through one end wall 13 there is formed an entrance aperture into which a grommet 23 is engaged and a conventional telephone cord (not illustrated) extends through this grommet and may be connected to conventional telephone circuits in the usual way. The wires connect with a switch 17A actuated by the switch plunger 17 as hereinbefore described thus connecting the various electrical components to the telephone circuits.

Also mounted within the casing is a dialing mechanism collectively designated 24 and including, on the underside, a fine tooth rotary portion 25, connect and disconnect switch mechanism 26 actuated by rotation of the rotary portion 25, a brake control assembly 27 and ancillary mechanism shown collectively by reference character 28, all of which are conventional and all of which are operatively connected to the transformer and the remainder of the telephone component contained within the casing 10. Details of this portion of the dialing mechanism will hereinafter be described.

A substantially rectangular opening 29 is formed within the upper panel 11 adjacent one end thereof and mounted for longitudinal sliding movement on the underside of the cover panel 11 and in alignment with opening 29, is a slider bar collectively designated 30. This slider bar which is in the form of an elongated metal or plastic strip, is mounted for longitudinal or end to end movement relative to the casing, within mounting channels 31 secured within and supporting within the casing 10 and examples of these channels are shown in FIGS. 2 and 4.

Means are provided to rotate the rotary portion 25 of the dialing mechanism, said means taking the form of a disc or wheel 32 operatively connected to the rotary portion 25, but being situated upon the upper side thereof just below the upper cover or panel 11.

A longitudinally extending rack bar 33 having teeth 34 formed along one edge thereof, is secured to the underside of the slider bar 30 adjacent one longitudinal edge 32A thereof and these teeth 34 mesh with the teeth 35 of the gear disc 32 as clearly illustrated in FIG. 2. The teeth and gear disc 32 lie in a plane parallel to the horizontal plane of the slide bar.

Means are provided to move the slider bar relative to the casing, said means taking the form of a plurality of spaced and parallel upstanding ribs 36 extending upwardly from the upper surface 37 of the slide bar and through the rectangular opening 29 in the upper panel 11 of the casing. Indicia such as numbers indicated by reference character 38 are engraved or otherwise placed upon the upper surface 37 between adjacent ribs 36 so that if the finger of an operator or a pencil or the like is engaged between adjacent ribs and the slider bar moved rightwardly or in the direction of arrow 39, until stopped by the inner transverse edge 29A of the rectangular aperture 29, the rotary mechanism of the dialing assembly will be rotated a predetermined amount against the pressure of the conventional spring shown schematically by reference character 40 in FIG. 2. Upon release of the slider bar, this spring will return the rotary assembly to the zero position and return the slider bar to the original position ready for a further number to be "dialed" into the rotary assembly.

This provides a novel and easy method of operating the rotary assembly by lengthwise movement of the slider bar rather than the conventional multi-apertured dial which not only suits the design of the telephone in this instance, but provides an operating structure for the rotary assembly which is easily operated by a person who may have difficulty in using the conventional telephone dial. This is because the spacing of the ribs 36 and the height that they extend above the surface 37 of the slider bar can be controlled to suit individual circumstances if desired.

Figure 9:
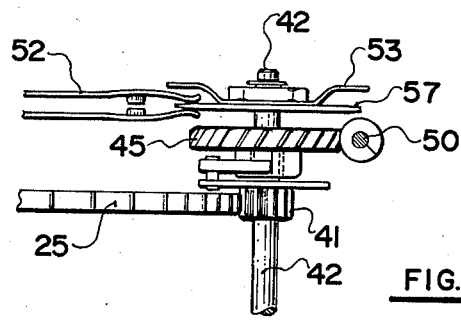
FIG. 9 is a fragmentary side elevation of FIG. 8.

Referring back to the dial portion and the ancillary mechanism, reference should be made to FIGS. 8 and 9.

The fine toothed rotary portion or disc 25 engages with a smaller gear 41 journalled upon a shaft 42 in turn supported within a support plate 43 within the casing which also supports shaft 44 connecting the fine tooth rotary disc 32 with the rack engaging disc 35 one upon each side of the plate 43.

Shaft 42 also carries a skew gear 45 thereon operatively connected to aforementioned brake control mechanism 27. This brake control mechanism 27 includes a stationary cylinder 46 within which is suited a rotatable centrifugal brake assembly 47 controlled by springs 48 and all mounted upon a worm gear shaft 49 journalled between the sides of the casing and including a worm gear 50 thereon which operatively engages the skew gear 45 so that the speed of release is controlled by this brake control mechanism when the slider is released.

Also mounted on shaft 42 above skew gear 45 is a plurality of lobes 51 rotatable with the shaft and operating an impulse switch assembly 52 operatively connected to the remainder of the telephone apparatus. It is essential that the impulse switch assembly 52 be in the closed position when the dial mechanism is in the zero position and at rest and in this connection a plurality of small blades or stops 53 are also secured to shaft 42 above the switch assembly 52. A spring bar 54 is secured to the hub 55 of fined tooth gear 25 and rotates therewith. This normally engages one of the stops 53 when the dial mechanism is in the zero and stationary position and when so engaged, it ensures that the lobes 51 are clear of the impulse switch assembly 52 so that this switch assembly is closed. As the slider is operated, the fine tooth ed disc 25 is rotated thus taking with it, the resilient bar 54 and clearing it from the stops 53 so that they are free to rotate with the shaft 42.

As soon as it returns to the zero and stationary position, it engages the adjacent stop in the position shown in FIG. 3 with the switch 52 in the closed position.

It should be stressed that the remainder of the structure secured within the casing is conventional and is operatively connected together in the usual manner.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A telephone assembly comprising in combination a casing including an upper side and a lower side, a dialing mechanism mounted within said casing, said dialing mechanism including a rotary assembly, said rotary assembly including a rotary portion and means to rotate said rotary portion, said means including a longitudinally extending slider bar mounted for reciprocal motion within the upper side of said casing and means operatively connecting said slider bar with said rotary portion of said rotary assembly, said means operatively connecting said slider bar with said rotary portion including a plurality of gear teeth extending along one side of said slider bar, and extending parallel to the horizontal plane of the slider bar and corresponding teeth upon the periphery of said rotary portion meshing with the gear teeth of said slider bar, whereby reciprocation of said slider bar rotates said rotary portion, said rotary assembly including a connect and disconnect switch, means on said rotary portion to operate said switch, a rotary impulse switch assembly within said casing movable from a switch open to a switch closed position as it rotates, gear means operatively connecting said rotary portion with said impulse switch assembly and a brake control component in said casing operatively connected to said impulse switch assembly, said impulse switch assembly including a skew gear rotatable therewith and a worm gear shift engaging said skew gear, said brake control assembly being operatively connected to said worm gear shaft and means on said rotary portion operatively engaging said impulse switch assembly to maintain said impulse switch assembly in the closed position when said dial mechanism is in the released and stationary position.

2. The assembly according to claim 1 which includes a speaker adjacent one end of the lower side of said casing and a microphone adjacent the opposite end of said lower side of said casing, said speaker and said microphone being operatively connected to said dialing assembly.

3. The telephone assembly according to claim 1 which includes means to move said slider bar lengthwise relative to said upper side of said casing, said casing being longitudinally apertured to expose part of said slider bar therethrough, said last mentioned means including a plurality of spaced and parallel transversely extending ribs on at least the portion of said slider bar exposed through said opening, and indicia on said exposed portion of said slider bar between adjacent ribs.

4. The telephone assembly according to claim 2 which includes means to move said slider bar lengthwise relative to said upper side of said casing, said casing being longitudinally apertured to expose part of said slider bar therethrough, said last mentioned means including a plurality of spaced and parallel transversely extending ribs on at least the portion of said slider bar exposed through said opening, and indicia on said exposed portion of said slider bar between adjacent ribs.

5. A dialing mechanism for telephones comprising in combination a rotary assembly, said rotary assembly including a rotary portion and means to rotate said rotary assembly, said means including a longitudinally extending slider bar and means operatively connecting said slider bar with the rotary portion of said rotary assembly, said means including a plurality of gear teeth extending along one side of said slider bar and extending parallel to the horizontal plane of the slider bar, and corresponding teeth formed upon the periphery of the rotary portion of said rotary assembly, said corresponding teeth meshing with the gear teeth of said slider bar, said means to move said slider bar lengthwise including a plurality of spaced and parallel transversely extending ribs formed on the upper side of said slider bar and indicia on the upper side of the said slider bar between adjacent ribs, said rotary assembly including a connect and disconnect switch, means on said rotary portion to operate said switch, a rotary impulse switch assembly within said casing movable from a switch open to a switch closed position as it rotates, gear means operatively connecting said rotary portion with said impulse switch assembly and a brake control component in said casing operatively connected to said impulse switch assembly, said impulse switch assembly including a skew gear rotatable therewith and a worm gear shaft engaging said skew gear, said brake control assembly being operatively connected to said worm gear shaft and means on said rotary portion operatively engaging said impulse switch assembly to maintain said impulse switch assembly in the closed position when said dial mechanism is in the released and stationary position.

* * * * *